United States Patent [19]
Bhattacharyya et al.

[11] 3,796,955
[45] Mar. 12, 1974

[54] GATE OXIDE EARLY FAIL SCREENING TEST UTILIZING A LOW PRESSURE PLASMA

[75] Inventors: Arup Bhattacharyya, Essex Junction; John B. Dinklage, South Burlington, both of Vt.

[73] Assignee: International Business Machines Corporation, Armonk, N.Y.

[22] Filed: Nov. 30, 1971

[21] Appl. No.: 203,385

[52] U.S. Cl.............. 324/158 T, 324/54, 324/158 D
[51] Int. Cl...................... G01r 31/26, G01r 31/12
[58] Field of Search.............. 324/158 T, 158 D, 54; 29/574, 593

[56] References Cited
UNITED STATES PATENTS
| 3,531,716 | 9/1970 | Tarui et al. ........................... 324/51 |
| 3,370,227 | 2/1968 | Bader et al. .......................... 324/54 |
| 3,611,122 | 10/1971 | Pahl, Jr................................ 324/54 |

OTHER PUBLICATIONS
Brouillard et al.; "Detection of Pinholes..."; IBM Tech. Dis. Bull.; Vol. 13; No. 2; July 1970; pg. 481–482.

Primary Examiner—Alfred E. Smith
Assistant Examiner—Ernest F. Karlsen
Attorney, Agent, or Firm—Francis J. Thornton

[57] ABSTRACT

A method of accelerating early gate oxide failures in Field Effect transistor devices. This method uses a d.c. glow discharge or plasma as a means for electrically inducing, on the gate electrode of such Field Effect Transistors, an electrical potential sufficient to stress the gate oxide under the electrode to a level higher than that seen in normal service. This stressing of the gate oxide is sufficient to cause in a short period of time the failure of those gate oxides which would normally fail within the first few hundred hours of use in the field. The described method accomplishes this very desirable result without affecting those other gate oxides which will perform satisfactorily in service.

This use of a plasma or glow discharge to induce the stressing voltage of the gate oxide eliminates the need of mechanically contacting each and every unit. The method of the invention, therefore, not only permits the batch stressing of such units during the production cycle, while the units are still incorporated in a wafer, but further allows subsequent testing of the units whether they be individual FET devices or whether they be corporated in an integrated circuit design.

11 Claims, 2 Drawing Figures

PATENTED MAR 12 1974  3,796,955

GATE OXIDE EARLY FAIL SCREENING TEST UTILIZING A LOW PRESSURE PLASMA

BACKGROUND OF THE INVENTION

1. Field of the Invention

This invention relates to the testing of semiconductor devices and more particularly to the detection and elimination of potential long term defects in such devices in a short period of time.

2. Description of the Prior Art

Accelerated life testing of semiconductor devices has long been practiced by the Quality Control functions of the semiconductor industry.

Generally, such life testing is performed using selected units which have completed the production cycle. The information so obtained is then related to other units usually on a lot bases, to either provide an indication of the rate of expected field returns, i.e., failures, or to provide a bases for considering changes in the production cycle itself. No accelerated life testing procedure is applied to each and every unit manufactured.

The most common practice for monolithic circuit testing is to functionally test each circuit prior to assembly by multi-point probing, while the circuits are still contained within a single wafer and before the wafer is cut up or diced. Each circuit is functionally checked, at this time, for d.c. performance and those units out of specification are marked for rejection after the dicing operation. In this way, some savings is realized since the failed units are not incorporated into their final environment.

The prior art also shows one method of testing continuity in semiconductor devices without contacting the connection being tested with a mechanical probe. This method is illustrated in U.S. Pat. No. 3,531,716 which teaches that by projecting an electron beam onto an individual electronic device to be tested, an electronic potential can be generated in the device so that by detecting the electrical potential of a portion of the device under test, an output signal can be obtained indicating whether or not the electronic connection is either good or bad.

Field Effect Transistors, i.e., FET devices, are well known semiconductor devices whose operation depends upon the modulation of the cross-sectional area of a conductive channel lying between two doped regions (the source and the drain) by a depletion region which penetrates the channel. The terminal used to vary this depletion region is a gate and is separated from the device by a thin layer of insulating material. This insulating material, also known as gate oxide, will in many instances fail in long term service because it contains stoichiometric amd structural defects, inclusions of foreign matter or mobile charges or ions. Each of these can cause a failure after an initial term of service. For example, mobile ions can migrate through the insulating layer under normal service conditions and ultimately accumulate at one place in sufficient quantity to create a conductive path between the underlying semiconductor body and the gate electrode to cause failure of the device.

OBJECT OF THE INVENION

Testing of semiconductor devices is a major problem, especially when large numbers of such devices are formed in complicated integrated circuits on a single wafer of material. If at selected times during the production cycle evaluation tests are performed to determine which units are good and if defective units or potentially defective units are eliminated early in the production cycle, considerable savings can be realized, since those failed units need not be passed through the remainder of the production of test cycles.

Accordingly, it is an object of the invention to provide an improved, testing procedure for semiconductor devices.

It is also an object of the invention to provide an improved accelerated life test for semiconductor devices.

It is another object of the invention to provide an improved means for the quick and early detection of potential long term failures in Field Effect Transistors.

It is a further object of the invention to provide such early detection of defective gate oxides in a group of FET transistors under test without deleteriously affecting good gate oxides in the remainder of the group.

It is still another object of the invention to provide a 100 percent accelerated life test of FET devices to realize an early time failure of potentially defective devices without deleteriously affecting good devices.

It is still a further object of the present invention to provide a method for testing semiconductor devices without the necessity of using mechanical probes.

The present invention is primarily directed toward a method for assessing the adequacy of gate oxides in FET devices. This method comprises the application of a d.c. glow discharge or plasma to the FET devices under test. A voltage potential is applied by the plasma across the gate oxide of each device so exposed to create an electrical field, relative to the substrate, across the gate oxide of sufficient intensity to cause a short period of time (i.e., ½ hour) failure of any gate oxides that contain either inherent defects or potential defects sufficient to cause the oxide to fail during the first few hundred hours of normal field operation.

The present invention thus permits an improved 100% lift test to be applied to a group of devices to detect early time gate oxide failures in the devices under test. This test is such that no deleterious effect is realized in those devices whose oxides do not contain defects that would cause early gate oxide failure.

The present invention particularly teaches the application of thermal and voltage stress to an FET gate oxide to provide a positive screening test for the integrity of the gate oxides of the FET's.

The foregoing and other objects, features and advantages of the invention will become apparent from the following more particular description of a preferred embodiment of the invention.

DESCRIPTION OF THE PREFERRED EMBODIMENT

Figure 1:
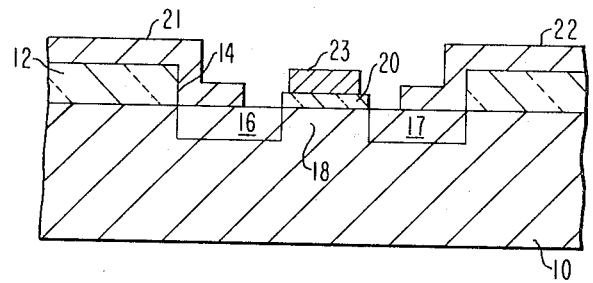
Figure 2:
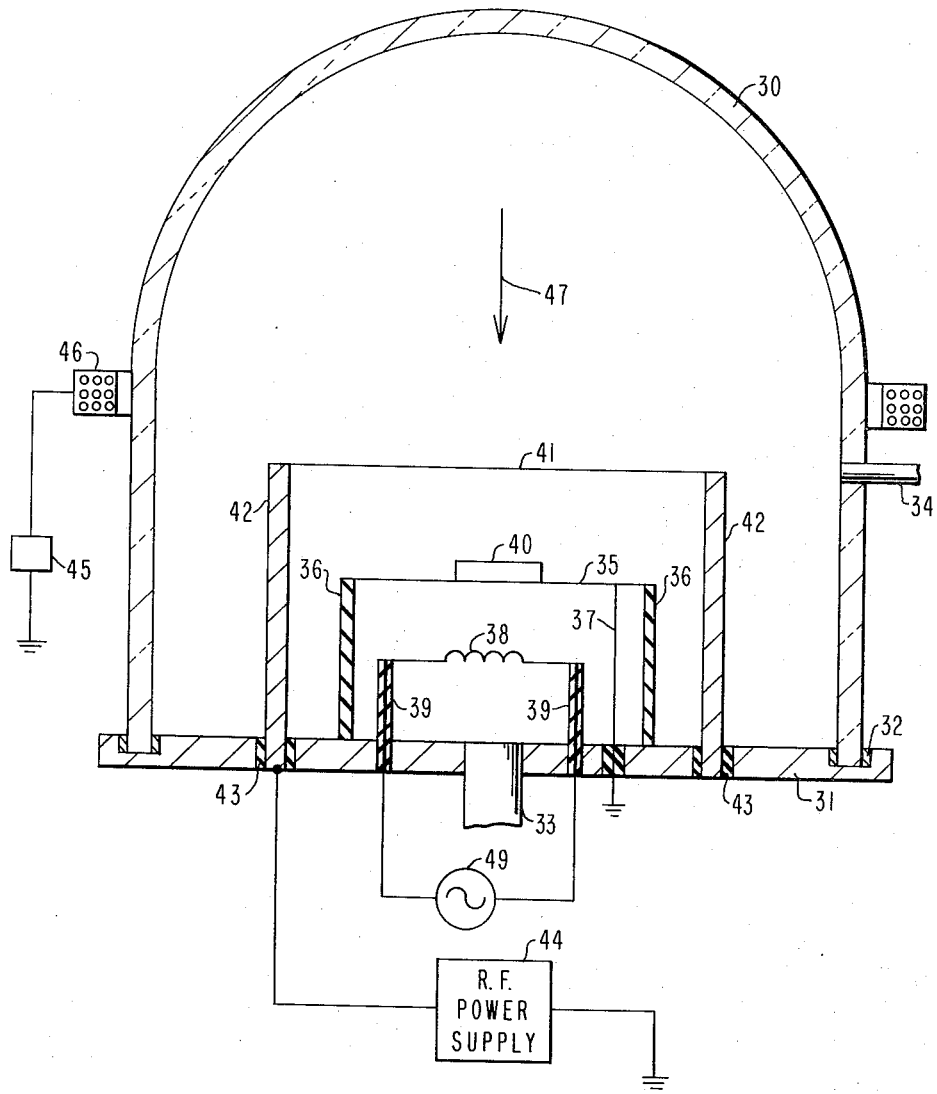

FIG. 1 illustrates a cross-sectional view of an FET device, which may be processed in accordacne with the teaching of this invention; and, FIG. 2 is a broken away elevational view of an apparatus which may be used in accordance with the present invention.

Referring now to FIG. 1, a portion of a wafer 10 containing an insulated gate Field Effect Transistor is shown. The wafer 10 is composed of semiconductor material, for example, N-type silicon. It is to be understood that although an N-type silicon semiconductor is described, the opposite conductivity type material could be used and semiconductor materials other than silicon could also be used. Disposed on the surface of the wafer 10 is a layer 12 of a suitable dielectric material such as silicon dioxide having a thickness of a out 5,000 A°. An opening 14 is provided through the coating 12, so as to initially expose the surface of the wafer 10 overlying a pair of spaced source and drain regions 16 and 17, respectively, which are separated one from the other by a channel region 18. The source and drain regions 16 and 17 have a conductivity type opposite to that of the body 10 and may be formed by standard diffusion techniques well known to the art.

A gate oxide 20, for example, silicon dioxide, having a thickness of 800 Angstroms or more, is formed by standard techniques over the channel region 18. Appropriate electrical contacts 21 and 22 are provided to the source and drain regions 16 and 17, respectively, and a gate electrode 23 is formed over the gate oxide 20.

The operation of such Field Effect Transistors is now fairly well known. Basically, such devices operate as follows. When a voltage is applied between the source 16 and the drain 17 current will flow through the channel region 18 provided that the gate electrode 23 is properly biased. The potential applied to the gate electrode 23 varies the width of the channel region and hence the amount of current flow through the channel region.

The normal voltage that is applied to the gate electrode 23 to create a suitable channel region, without causing breakdown of the device, is a function of the dielectric strength of the gate oxide 20 and its thickness. Such gate oxides generally are formed by growing the oxide in situ by the well known thermal growth process. There will, with any process when creating FET devices, be formed a statistical number of gage oxides that will contain defects. These defects can range from mechanical defects, such as pinholes in the oxide or dirt or dust particles either on the surface of the body or as inclusions in the oxide itself or pits, to chemical stoichiometric and structural defects to electrical defects such as are caused by mobile, charged ions in the oxide.

With present day semiconductor processing a multiplicity of such FET devices can be built into a single wafer or semiconductor material. Typically, the wafer of semiconductor material can range from 1 to 3 inches in diameter and can contain many hundreds of such FET devices, either as discrete devices or as parts of integrated circuits.

When the individual devices or circuits contained within such a wafer are tested at final test, any of the above described defects or a combination of them can, in one or more of the hundreds of discrete gate oxides of the FET devices so produced on the wafer, cause the gate oxide or oxides, containing such defects, to breakdown at a voltage below the normal applied gate voltage and thus contribute to the failure rate of the tested devices Some of the above listed defects, such as the pinhole through the oxide, permits the gate electrode to actually contact the underlying semiconductor body. This causes a short circuit between the gate electrode and the semiconductor body and thus in an immediate failure. The effects of some of these other defects, such as stoichiometric and structural defects or the presence of mobile charges in the oxide will, on the other hand, under normal operating conditions, become apparent only after many hours of normal use; i.e., 100 hours or more. In some instances these defects will cause a slow decline in the voltage sustainable across the gate oxide while others will suddenly and catastrophically breakdown cuasing a short circuit. In either case these defects ultimately can cause initially appearing good gate oxides to deteriorate such that they can no longer sustain the normal applied gate voltages and thus they become classed as failures. These defects are thus said to give rise to long term oxide failure mechanisms.

It has now been found by the present inventors that by stressing such FET devices at a voltage in excess of a normal gate voltage, these long term failure mechanisms can be detected and the devices affected by them eliminated in a relatively short test period. A typical test period when using the present invention would be one half-hour or less.

The acceleration of such defect induced failure mechanisms is accomplished particularly by the present invention when thhe following procedure is used in conjunction with the apparatus shown in FIG. 2.

As shown in FIG. 2 a bell jar 30 is mounted on a base plate 31, having an annular seal 32 serving to seal the bell jar 30 with respect to the plate 31. A vent 33 on plate 31 is provided for so that the bell jar 30 can have its atmosphere evacuated with a suitable vacuum pump (not shown). After the desired vacuum is reached within the bell jar 30, a port 34 permits the evacuated bell jar 30 to be back filled with a relatively inert gas introduced into the bell jar 30 through the port 34 from a reservoir (not shown).

Within the bell jar 30, an electrically grounded anode 35 is supported above the surface of the plate 31 by suitable thermal isolated members 36, such as ceramic standoffs, securely mounted on plate 31. Because members 36 will also serve to electrically isolate anode 35 from plate 31, an electrical lead 37 is provided to couple anode 35 to electrical ground. Located beneath the anode 35 is a suitable heater shown as a coil 38. This coil 38 is also supported by thermal and electrical insulating, standoff members 39 which maintain the coil 38 above the plate 31. This coil 38 is preferably of tungsten and is connected to a suitably controlled power supply 49. The coil 38 must be sufficient to raise the temperature of the anode and a semiconductor wafer 40 resting on the anode to a temperature of at least 70°C and preferably up to 250°C. The wafer 40 may be, for example only, a slice of semiconductor material such as silicon having one or more FET devices similar to that shown in FIG. 1 formed therein.

In spaced opposition to the anode 35 is a cathode 41 supported by conductive posts 42 insulated from plate 31 by electrically insulating inserts 43 maintained in plate 31. The cathode 41 is connected through posts 42 to an RF power supply 44. An additional power supply 45 is coupled to an electro-magnet 46 such that when the electro-magnet 46 is energized, a magnetic filed H, shown as arrow 47, is applied across the wafer 40 and normal thereto.

To achieve the proper stress conditions in gate oxides formed of silicon dioxide, the following conditions are used. The device 40 is placed in the bell jar 30 which is evacuated through vent 33 to a pressure in the range of between $5 \times 10^{-6}$ and $5 \times 10^{-7}$ Torr. Once the pressure in the bell jar 30 reaches this level, a noble gas, such as argon is introduced into the bell jar. When argon is used, a pressure of between 1 to 10 microns may be used, with the preferred pressure level being 5 microns. Although argon is particularly desired in the operation of the present invention, the other noble gases could be used equally as well and indeed in many cases a relatively inert gas such a nitrogen could also be used.

Once the desired pressure of argon is achieved in the bell jar, the power supply 49 can be activated to cause coil 38 to heat the anode plate 35 and raise the temperature of the wafer 40 situated thereon. In most instances it is desirable that the temperature of the wafer be raised to about 185°C. This heating of the wafer aids in causing mobile ions in the oxides to more effectively migrate towards preferred positions, such as stichiometric and/or structural defects in the oxide layer causing breakdown. It should be understood, of course, such stichiometric and/or structural defects can, in themselves, be of a nature that they will cause the oxide to have a lower dielectric strength than it should have. Once the wafer 40 reaches the desired termperature, power supply 44 is activated and power is applied to the cathode 41.

Typically, such FET gate oxides range in thickness from 800 to 1,000 Angstroms of silicon dioxide. Preferably for these thicknesses, kilowatt of power at a frequency of about 13.7 Megahertz is applied to the cathode 41. Simultaneously, power supply 45 is activated to cause electro-magnet 46 to apply a magnetic field of between 40 and 70 gauss normal to the wafer. The described magnetic field conditions together with the described power applied to the cathode, because of the difference in potential between the cathode and the grounded anode 35, causes a plasma or glow discharge to be established in the argon gas between the cathode and the anode. The presence of this plasma, in the cathode to anode interpsace, acts to impress an electrical field of between $1 \times 10^6$ and $4 \times 10^6$ volts per centimeter across the gate oxides existing on the surface of the semiconductor wafer 40. The above described voltages, pressures and fields are particularly useful when the oxide is silicon dioxide, the anode 35 and the cathode 41 are both approximately 12 inches in diameter and are separated, one from the other, by a spacing of two inches. With different oxides, oxide thicknesses, and sizes of the cathode and anode and/or spacing between them, different conditions; e.g., voltages, pressures, magnetic fields, etc., would be required. The variations that would have to be made in the different parameters can be readily calculated and determined by one skilled in the use and creation of plasmas or glow discharges.

This impressed electric field, of between $1 \times 10^6$ and $4 \times 10^6$ volts/cm, is below the normal dielectric strength of a good uniform gate oxide formed of silicon dioxide, however, it is sufficient to cause, in the region of existing defects, local intense electric fields in excess of $4 \times 10^6$ volts/cm thus causing breakdown of the oxide in the region of the defects. The reason such breakdown occurs, in the region of the defects, is because the dielectric strength of the oxide is appreciably lowered by such defects. Thus the dielectric strength of an oxide containing defects is lower than that of an oxide that does not contain defects.

When any particular oxide breaks down, current begins to flow from the plasma into the underlying semiconductor body. Because, however, this is a localized phenomenon in the plasma and because the plasma is gaseous in nature, it has a self healing effect. Therefore, current flows caused by an oxide breakdown in a particular device does not affect the field strength imposed on an adjacent electrically isolated gate oxide of a different device even though both devices are contained in the same wafer. Thus many FET's on a single wafer can be successfully tested. Even if many of the tested devices have defects therein, such as will cause short circuits, the test can be preformed without seriously disturbing or upsetting the imposed electric field across other gate oxides of other devices in the same wafer which has not failed.

Although the above described conditions impress a negative bias across the gate oxide, either a negative bias or a positive bias on the gate oxide can be used with adequate results being achieved.

The inventors have further found that such plasmas can impress a voltage stress on an oxide even though a metallic electrode is not laid down on the surface of the oxide. That is, the charge accumulation in the plasma can, in itself, act as an electrode with respect to the gate oxide. It should be understood in that although a gate oxide composed of a single layer of silicon dioxide has been described in conjunction with the present invention, that the present invention is also applicable to those FET devices which utilize either multilayer dielectrics, such as silicon dioxide and silicon nitride or more exotic dielectrics such as gallium nitride, silicon nitride and titianium dioxide.

It should further be understood that although it is preferred that the substrate be heated above room temperature (25°C) that such heating is not necessary. However, if the substrate is not heated, then the devices must be electrically stressed for a longer period of time.

The present invention thus describes a method of achieving early gate oxide failures in field effect devices by stressing of the gate oxide to cause, in a short period of time, the failure of those gate oxides which would normally fail within the first few hundred hours of field use.

While the invention has been particularly shown and described with reference to the preferred embodiment thereof, it will be understood by those skilled in the art that various changes in form and details of the apparatus and method may be made therein without departing from the spirit and scope of the invention and that the method is in no way restricted by the apparatus.

What is claimed is:

1. A method for assessing the integrity of a dielectric layer on the surface of a semiconductor wafer comprising the steps of placing a semiconductor wafer, having a dielectric layer on a surface thereof, on a support within a closed chamber, evacuating said chamber, introducing an inert gas into said evacuated chamber, creating a glow discharge in said chamber and in contact with said layer to impress across said layer a given field and inspecting said wafer to determine imperfections in said dielectric layer caused by said field.

2. A method for accelerating gate oxide failure in FET devices comprising the steps of immersing the FET devices in a low pressure plasma of high density creating a d.c. glow discharge between a semiconductor substrate containing an FET device, and a spaced electrode, said FET device having a gate oxide, electrically contacting said gate oxide with said glow discharge, electrically inducing on said gate oxide an electrical field of between $1 \times 10^6$ volts/cm and $4 \times 10^6$ volts/cm, relative to the semiconductor substrate to stress the gate oxide relative to the semiconductor substrate sufficiently to accelerate the formation of any potential failure mechanism in said gate oxide, and inspecting said FET devices to determine imperfections in said gate oxide caused by said field.

3. A method of claim 1 wherein said glow discharge is imposed on said dielectric for a period of about 30 minutes, said dielectric comprises an oxide and said field is between $1 \times 10^6$ volts/cm and $4 \times 10^6$ volts/cm.

4. The method of claim 3 where there is further provided the step of imposing a magnetic field on said oxide normal to said oxide.

5. The method of claim 4 wherein said magnetic field has a field strength greater than 40 gauss.

6. The method of claim 4 wherein said magnetic field has a field strength of between 40 and 70 gauss.

7. The method of claim 1 wherein there is further provided the step of heating said wafer.

8. The method of claim 7 wherein said wafer is heated to a temperature between 25°C and 250°C.

9. A method of stressing oxide layers on the surface of semiconductor wafers to test the integrity of such oxide layers and to cause the early failure of imperfect oxide layers comprising the steps of, immersing the wafers in a low pressure plasma of high density established between the wafer and a cathode, increasing the potential between said cathode and said wafers to impress across the oxide an electric field of between $1 \times 10^6$ volts/cm and $4 \times 10^6$ volts/cm and maintaining said electric field across the oxide for a period of time to cause the breakdown of oxides containing imperfections, and inspecting said wafers to determine imperfections in said oxide layer caused by said field.

10. A method for assessing the integrity of each oxide layer on a semiconductor having a plurality of discrete oxide layers thereon comprising the steps of, placing a semiconductor, having a plurality of discrete oxide layers on a surface thereof, on a support within a closed chamber, said support being disposed between a cathode and an anode within said chamber, evacuating said chamber to less than $5 \times 10^{-6}$ torr, introducing 1 – 10 microns of an inert gas capable of supporting a glow discharge into said chamber, said gas being selected from the group consisting of nitrogen, the noble gases and mixtures thereof, heating said semiconductor material to a temperature of between 70°C and 250°C, inpressing a voltage potential between said anode and said cathode to create a glow discharge in said gas within said chamber, impressing a magnetic field on said semiconductor normal to the semiconductor surface having the oxide layer thereon, and modifying the voltage between the cathode and anode to impress an electric field of between $1 \times 10^6$ volts/cm and $4 \times 10^6$ volts/cm across said oxide layers to cause failures to occur, in less than 1 hour, in those oxide layers which contain potential defects which would under normal conditions cause the oxide layers to fail during the first few hundred hours of operation without creating a deleterious affect in those oxides which do not contain inherent defects that would cause early oxide failure.

11. An apparatus for applying a stressing voltage to oxides formed on the surface of a semiconductor wafer comprising in combination, a closed chamber, a base plate for supporting said chamber, means for evacuating said chamber, means for admitting an ionizable gas into the chamber, anode means for supporting a semiconductor wafer having an oxide layer on a surface thereof within the chamber so that the wafer is substantially at the same potential as said anode, cathode means within said chamber and spaced apart from said anode a pre-determining distance, means for heating the wafer supported on said anode to a temperature of at least 125°C, magnetic means surrounding said chamber for imposing a magnetic field normal to a wafer supported on said anode, and means coupled to said cathode for establishing a glow discharge between said anode and said cathode and for impressing an electrical field of between $1 \times 10^6$ volts/cm and $4 \times 10^6$ volts/cm across said oxide.

* * * * *